W. H. Harfield,
Capstan,
Nº 36,087. Patented Aug 5, 1862.
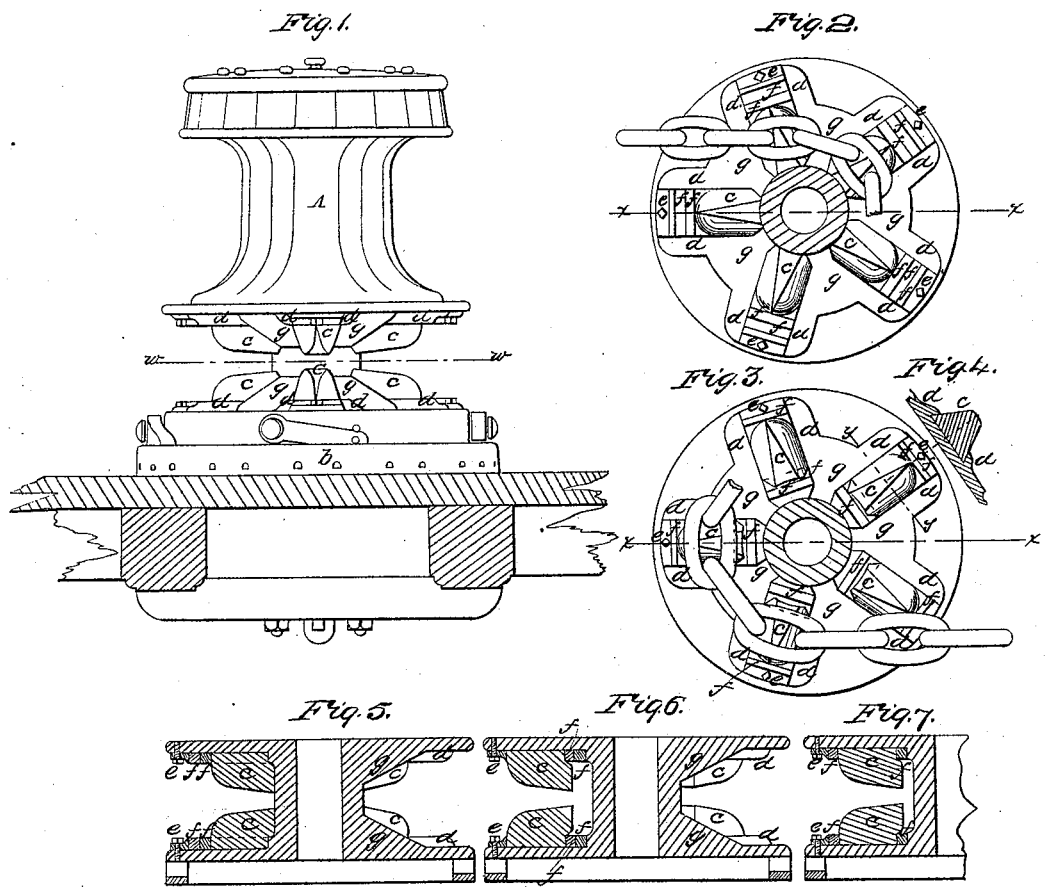

UNITED STATES PATENT OFFICE.

WILLIAM H. HARFIELD, OF LONDON, ENGLAND.

IMPROVED CONSTRUCTION OF CHAIN WINDLASSES AND CAPSTANS.

Specification forming part of Letters Patent No. 36,087, dated August 5, 1862.

*To all whom it may concern:*

Be it known that I, WILLIAM HORATIO HARFIELD, of No. 2 Royal Exchange Buildings, in the city of London and United Kingdom of Great Britain, have invented a new and useful improvement in that description of capstans which are employed in the process of working chain cables; and I do hereby declare that the following is a full and exact description thereof, reference being had to the accompanying drawings, which form a part of this specification.

The peculiar and characteristic feature of the capstan which has heretofore been employed in the process of working chain cables is a flaring and radially-flanged annular recess near the base of the same, the flanges or stops in which have either been cast with or rigidly secured to the flaring sides of the same.

My improvement in the said capstan consists in combining the flanges $c\ c$ with the sides $g\ g$ of the flaring annular recess of the same, in such a manner that the said flanges can be moved outwardly or inwardly and be secured in any position that may be desired to adapt the said capstan to the working of cables of widely-different sizes.

In the accompanying drawings, Figure 1 is a side view of my improved capstan; Fig. 2, a transverse section in the line $w\ w$ of Fig. 1; Fig. 3, a section also in the line $w\ w$ of Fig. 1, showing a different adjustment of the movable flanges or stops $c\ c$; Fig. 4, a section in the line $y\ y$ of Fig. 3; Fig. 5, a section in the line $x\ x$ of Fig. 2; Fig. 6, a section in the line $x\ x$ of Fig. 3; and Fig. 7 is a section which shows a central adjustment of the flanges $c\ c$.

The requisite number of dovetail radial grooves are formed opposite to each other in the flaring recess in my improved capstan for the reception of the flanges or stops $c\ c$, and when the flanges are placed in the said radial grooves the employment of the respective series of filling-blocks, $f\ f$, and the set-screws $e\ e$, in the manner represented in the accompanying drawings, enable the said flanges to be adjusted and secured in any desired position. The extreme inner position of the said flanges to adapt their action to the smaller sizes of chain cables being represented by Figs. 2 and 3, the extreme outer position of said flanges, to adapt their action to the larger sizes of cables, being represented by Figs. 3 and 6, and a medium position of said flanges being represented by Fig. 7. The sides of the dovetail grooves, which extend outward beyond the flaring portions $g\ g$ of the inner faces of the cable-receiving recess of my improved capstan, are designated in the accompanying drawings by the letters $d\ d$.

When my improved capstan is in use, the cable plays in the radially-flanged annular recess thereof in the manner represented by Figs. 2 and 3 of the drawings, the horizontal links of said cable passing freely through the spaces between opposite faces of pairs of corresponding flanges $c\ c$, and the alternating vertical links of the cable dropping into the flaring spaces between the inclined sides of said flanges, an arrangement, it will be perceived, that enables the cable to be handled smoothly and safely by the turning of the capstan, the inclined shape of the sides of the spaces between the flanges $c\ c$ serving the purpose of preventing any of the ordinary variations in the length of the links of cables from causing any jamming or imperfection in the movement of the cable through the said flanged annular space of the capstan.

In conclusion I would say that my said improved chain cable carrying annular recesses may be used in connection with ships' windlasses as well as with capstans, and therefore I do not intend to restrict myself to the use of said improvement when it is combined with capstans.

What I claim as my invention, and desire to secure by Letters Patent, is—

Securing the radial flanges or stops $c\ c$ to the sides of the annular recess in my improved chain-cable-working capstan (or windlass) in such a manner that the said flanges can be withdrawn from their positions within the said annular recess, or be secured in any desired position within the same, for the purpose of adapting the capstan (or windlass) to the handling of cables of widely-varying sizes, substantially as herein set forth.

The above specification of my improved apparatus for working and stoppering cables signed this 2d day of May, 1862.

W. H. HARFIELD.

In presence of—
HITT DUFF,
  *Notary Public.*
G. D. DUFF,
*Notary Public,* 5 *Nicholas Lane, London.*